United States Patent
Satoh et al.

(10) Patent No.: US 10,412,268 B2
(45) Date of Patent: Sep. 10, 2019

(54) IMAGE CAPTURING SYSTEM INCLUDING A CONTROLLER TO CONTROL SUPPLY OF A SYSTEM CLOCK TO AN IMAGER

(71) Applicants: Nobuyuki Satoh, Kanagawa (JP); Junichi Moribe, Kanagawa (JP)

(72) Inventors: Nobuyuki Satoh, Kanagawa (JP); Junichi Moribe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/459,266

(22) Filed: Mar. 15, 2017

(65) Prior Publication Data

US 2017/0272617 A1    Sep. 21, 2017

(30) Foreign Application Priority Data

Mar. 18, 2016    (JP) ................................ 2016-054779
Feb. 2, 2017    (JP) ................................ 2017-017456

(51) Int. Cl.
*H04N 1/60* (2006.01)
*H04N 1/00* (2006.01)
*H04N 1/46* (2006.01)

(52) U.S. Cl.
CPC ....... *H04N 1/6008* (2013.01); *H04N 1/00045* (2013.01); *H04N 1/0066* (2013.01);
(Continued)

(58) Field of Classification Search
None
See application file for complete search history.

(56) References Cited

U.S. PATENT DOCUMENTS 5,414,537 A *    5/1995    Omuro .................... H04N 1/60
                                                             358/518
6,249,362 B1 *    6/2001    Sato ..................... H04N 1/3875
                                                             358/1.9
(Continued)

FOREIGN PATENT DOCUMENTS

CN    101938589 A    1/2011
CN    101969522 A    2/2011
(Continued)

OTHER PUBLICATIONS

Office Action dated Sep. 19, 2018 in corresponding Chinese Patent Application No. 201710153984.0 (with English Translation), 20 pages.

(Continued)

*Primary Examiner* — Thomas D Lee
(74) *Attorney, Agent, or Firm* — Oblon, McClelland, Maier & Neustadt, L.L.P.

(57) ABSTRACT

An image capturing system includes an imager, a detector, and a controller. The imager is configured to move relative to an object to be imaged and capture an image of the object. The detector is configured to detect a predetermined relative position of the object with respect to the imager. The controller is configured to switch from stop supplying a system clock to supplying the system clock based on the detected predetermined relative position. The system clock is used to control a timing to start capturing an image by the imager. After stops supplying the system clock, the controller resumes supplying the system clock to the imager according to a relative movement of the object, based on the detected predetermined relative position.

15 Claims, 14 Drawing Sheets

(52) U.S. Cl.
CPC ..... *H04N 1/00087* (2013.01); *H04N 1/00251* (2013.01); *H04N 1/00649* (2013.01); *H04N 1/46* (2013.01)

(56) References Cited

U.S. PATENT DOCUMENTS

| | | |
|---|---|---|
| 2012/0069411 A1 | 3/2012 | Satoh et al. |
| 2012/0236308 A1 | 9/2012 | Satoh |
| 2013/0027720 A1 | 1/2013 | Satoh |
| 2013/0027721 A1 | 1/2013 | Kobayashi et al. |
| 2013/0135484 A1 | 5/2013 | Satoh et al. |
| 2013/0208289 A1 | 8/2013 | Satoh et al. |
| 2013/0229671 A1 | 9/2013 | Yokozawa et al. |
| 2013/0242319 A1 | 9/2013 | Suzuki et al. |
| 2013/0242320 A1 | 9/2013 | Suzuki et al. |
| 2013/0242321 A1 | 9/2013 | Okada et al. |
| 2013/0242361 A1 | 9/2013 | Matsumoto et al. |
| 2013/0258368 A1 | 10/2013 | Shigemoto et al. |
| 2013/0258369 A1 | 10/2013 | Suzuki et al. |
| 2014/0218754 A1 | 8/2014 | Satoh et al. |
| 2015/0070737 A1 | 3/2015 | Hirata et al. |
| 2015/0085305 A1 | 3/2015 | Suzuki et al. |
| 2015/0109646 A1 | 4/2015 | Yokozawa et al. |
| 2015/0146053 A1 | 5/2015 | Satoh et al. |
| 2015/0158309 A1 | 6/2015 | Fujii et al. |
| 2015/0162372 A1 | 6/2015 | Yorimoto et al. |
| 2015/0248597 A1 | 9/2015 | Matsumoto et al. |
| 2015/0375498 A1 | 12/2015 | Horikawa et al. |
| 2016/0004202 A1 | 1/2016 | Morita et al. |
| 2016/0031250 A1 | 2/2016 | Yokozawa et al. |
| 2016/0080610 A1 | 3/2016 | Kawarada et al. |
| 2016/0080611 A1 | 3/2016 | Yorimoto et al. |
| 2016/0171348 A1 | 6/2016 | Satoh et al. |
| 2016/0243866 A1 | 8/2016 | Yokozawa et al. |
| 2016/0347052 A1 | 12/2016 | Kawarada et al. |
| 2016/0366288 A1 | 12/2016 | Sasa et al. |

FOREIGN PATENT DOCUMENTS

| | | |
|---|---|---|
| CN | 102202172 A | 9/2011 |
| CN | 103308174 A | 9/2013 |
| CN | 103323118 A | 9/2013 |
| JP | 02-041082 | 2/1990 |
| JP | 2001-326853 | 11/2001 |
| JP | 2002-344800 | 11/2002 |
| JP | 2005-191960 | 7/2005 |
| JP | 2013-224924 | 10/2013 |
| JP | 5625666 | 10/2014 |

OTHER PUBLICATIONS

Chinese Office Application dated Jun. 13, 2019 in Chinese Application No. 201710153984.0 with concise English translation.

* cited by examiner

IMAGE CAPTURING SYSTEM INCLUDING A CONTROLLER TO CONTROL SUPPLY OF A SYSTEM CLOCK TO AN IMAGER

CROSS-REFERENCE TO RELATED APPLICATIONS

The present application claims priority under 35 U.S.C. § 119 to Japanese Patent Application No. 2016-054779, filed on Mar. 18, 2016 and Japanese Patent Application No. 2017-017456, filed on Feb. 2, 2017. The contents of which are incorporated herein by reference in their entirety.

BACKGROUND OF THE INVENTION

1. Field of the Invention

The present invention relates to an image capturing system, an image forming device, an image capturing method, and a computer-readable recording medium.

2. Description of the Related Art

Conventionally, a technology of performing color adjustment in an image forming device by capturing an image of a color pattern (object to be imaged) that is formed on a recording medium by an image forming device, using an image capturing device, based on red, green, and blue (RGB) values of the color pattern obtained from the captured image or colorimetric values converted from the RGB values has been known (for example, see Japanese Patent No. 5625666).

The technology described above is capable of performing a self-calibration on spectral distribution of light from a light emitting diode (LED) light source, variations due to the change in spectral sensitivity of a sensor over time, and the like, at low cost and with high accuracy.

In an image capturing device that uses a low-cost two-dimensional sensor with a complementary metal oxide semiconductor (CMOS) and the like, the frame rate is fixed, and the frame rate is low. When colorimetry is performed on an object to be imaged or when the object to be imaged is measured using the image capturing device such as the above, there is a problem in that an image of the object to be imaged cannot be obtained, because the timing of capturing the image of the object to be imaged does not match.

SUMMARY OF THE INVENTION

According to one aspect of the present invention, an image capturing system includes an imager, a detector, and a controller. The imager is configured to move relative to an object to be imaged and capture an image of the object. The detector is configured to detect a predetermined relative position of the object with respect to the imager. The controller is configured to switch from stop supplying a system clock to supplying the system clock based on the detected predetermined relative position. The system clock is used to control a timing to start capturing an image by the imager. After stops supplying the system clock, the controller resumes supplying the system clock to the imager according to a relative movement of the object, based on the detected predetermined relative position.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
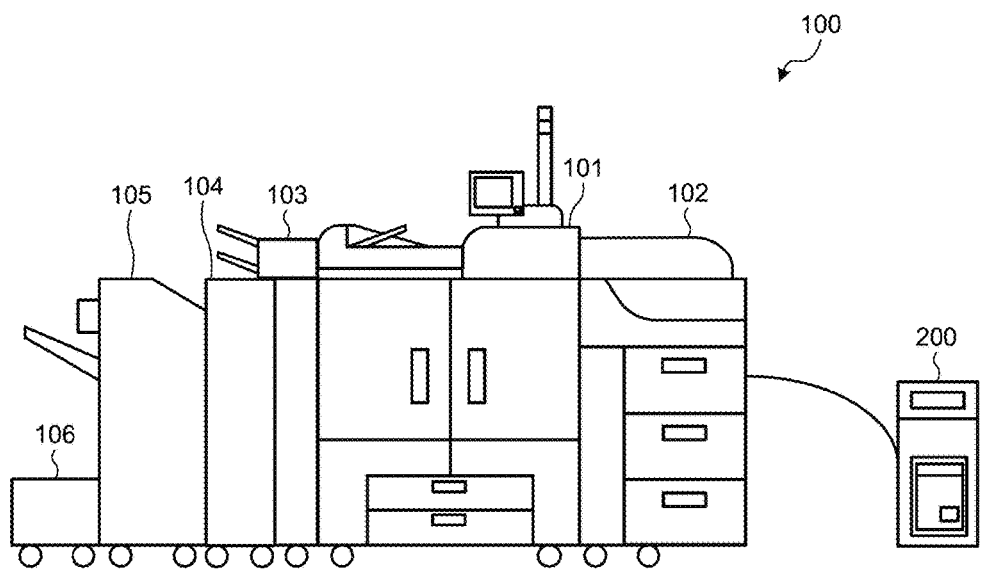
FIG. 1 is an exterior view of an image forming device of an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image capturing system, an image forming device, an image capturing method, and a computer-readable recording medium that can capture an image of a target location in an object to be imaged with high accuracy.

In the following embodiment, an electrophotographic image forming device that is configured as a production printer is explained as an example of an image forming device to which the present invention is applied. However, it is to be understood that the present invention is broadly applicable to various types of image forming devices that form an image on a recording medium, and naturally applicable to an inkjet image forming device.

Image Forming Device

FIG. 1 is an exterior view of an image forming device 100 of the embodiment. As illustrated in FIG. 1, the image forming device 100 of the present embodiment includes a main body unit 101 that forms an image on a recording medium M (see FIG. 5) using an electrophotographic method. In other words, the main body unit 101 functions as an image forming unit.

The image forming device 100 is configured by combining peripheral devices such as a large capacity paper feeding unit 102, an inserter 103, a folding unit 104, a finisher 105, and a cutting machine 106 with the main body unit 101 according to the usage. The large capacity paper feeding unit 102 supplies the recording medium M. The inserter 103 is used for supplying a cover and the like. The folding unit 104 performs a folding process on the recording medium M on which an image is formed. The finisher 105 performs stapling, punching, and the like. The cutting machine 106 performs cutting.

In addition, an external controller 200 called a digital front end (DFE) is connected to the image forming device 100.

The main body unit 101 forms an image on the recording medium M that is supplied from a paper feeding tray in the main body unit 101 or the large capacity paper feeding unit 102 using an electrophotographic image forming process, based on raster image data on which raster image processing (RIP) is performed by the external controller 200.

The recording medium M on which an image is formed by the main body unit 101 is conveyed to a subsequent stage of the main body unit 101. For example, the recording medium M is bound into a book, after the folding process by the folding unit 104, stapling and punching by the finisher 105, cutting by the cutting machine 106, and the like, are performed on the recording medium M according to the needs, with a cover that is supplied from the inserter 103 and the like. The electrophotographic image forming process executed in the main body unit 101, and the processes executed by the peripheral devices connected to the main body unit 101 have been known. Thus, the detailed description thereof will be omitted.

The color of an image to be formed on the recording medium M by the main body unit 101 may not be a desirable color, due to the specific characteristic of the main body unit 101 and the characteristic change over time. Consequently, in the image forming device 100 of the present embodiment, calibration such as color adjustment is performed at a predetermined timing, to improve color reproducibility of an image formed by the main body unit 101.

During the calibration, the main body unit 101 of the image forming device 100 forms a color pattern (an example of an object to be imaged) of predetermined colors on the recording medium M. An image capturing system 10 (see FIG. 2), which will be described below, then reads out the color pattern. By adjusting various parameters in the image forming process based on the RGB values of the obtained color pattern, or colorimetric values of the color pattern that are calculated based on the RGB values (RGB values and colorimetric values are examples of color information), the image forming device 100 adjusts the various parameters in the image forming process. Consequently, the color of an image formed by the main body unit 101 is brought close to the target color.

The image capturing system 10 that reads out the color pattern formed on the recording medium M by the main body unit 101, includes a two-dimensional sensor 15a (see FIG. 4) that is disposed on a conveyance path of the recording medium M on which the color pattern is formed. In the present embodiment, the two-dimensional sensor 15a is formed as the main body of an image capturing device 15 (see FIG. 3) that is an image capturing unit, which will be described in detail below. As will be described in detail below, the image capturing device 15 captures an image including a color pattern, and calculates colorimetric values of the color pattern based on the captured image.

The colorimetric values of the color pattern calculated by the two-dimensional sensor 15a that configures the image capturing device 15, are sent to the main body unit 101.

In the main body unit 101, various parameters in the image forming process are adjusted, based on the colorimetric values of the color pattern that are sent from the two-dimensional sensor 15a. Consequently, color adjustment for adjusting the adhesion amount of toner, which is used as a coloring material, on the recording medium M is performed, and the color of an image formed by the main body unit 101 is brought close to the target color.

The main body unit 101 in the image forming device 100 of the present embodiment adjusts various parameters in the image forming process, based on the colorimetric values of the color pattern. However, it is not limited thereto. For example, the main body unit 101 may adjust various parameters in the image forming process, based on the RGB values of the color pattern. In this case, the two-dimensional sensor 15a that configures the image capturing device 15 may not have a function of calculating the colorimetric values of a color pattern, as long as the two-dimensional sensor 15a can capture an image including a color pattern and output the RGB values.

In addition, in the present embodiment, the two-dimensional sensor 15a is used as the image capturing device 15 for reading out a color pattern. However, it is not limited thereto. For example, the image capturing device 15 may obtain at least color information of the color pattern. Consequently, instead of using the two-dimensional sensor 15a, the image capturing device 15 may use a detector that has a simple configuration including a light receiving element for receiving reflection light, and dispose such a detector on the conveyance path of the recording medium M on which the color pattern is formed.

Furthermore, in the present embodiment, the image capturing system 10 that reads out a color pattern is built into the image forming device 100, in other words, the image forming device 100 includes the image capturing system 10. However, it is not limited thereto. For example, an image capturing system for reading out a color pattern that is formed on the recording medium M by the image forming device 100, may be configured as another device different from the image forming device 100. In this case also, the image capturing system is configured of an image capturing device or a detector that is disposed on the conveyance path of the recording medium M on which the color pattern is formed.

In the present embodiment, the image capturing device 15 is stopped, and the object to be imaged (color pattern formed on the recording medium M) moves in the conveyance direction. However, it is not limited thereto. In the embodiment, the object to be imaged (color pattern formed on the recording medium M) may be stopped, and the image capturing device 15 may move in a main scanning direction. In other words, the image capturing device 15 may capture an image of the object to be imaged, by moving relative to the object to be imaged (color pattern formed on the recording medium M).

In addition, in the present embodiment, the main body unit 101 includes a moving body detection sensor 80 (see FIG. 8) that is a detection unit, on a predetermined position on the conveyance path of the recording medium M (see FIG. 5) that is an upstream side in the conveyance direction relative to the image capturing system 10.

The moving body detection sensor 80 is a photosensor that optically detects the tip end of the recording medium M (moving body) that passes a predetermined position on the conveyance path toward the image capturing system 10.

More specifically, upon detecting the tip end of the recording medium M being conveyed, the moving body detection sensor 80 outputs information (timing signal) to the image capturing system 10.

Image Capturing System

Figure 2:
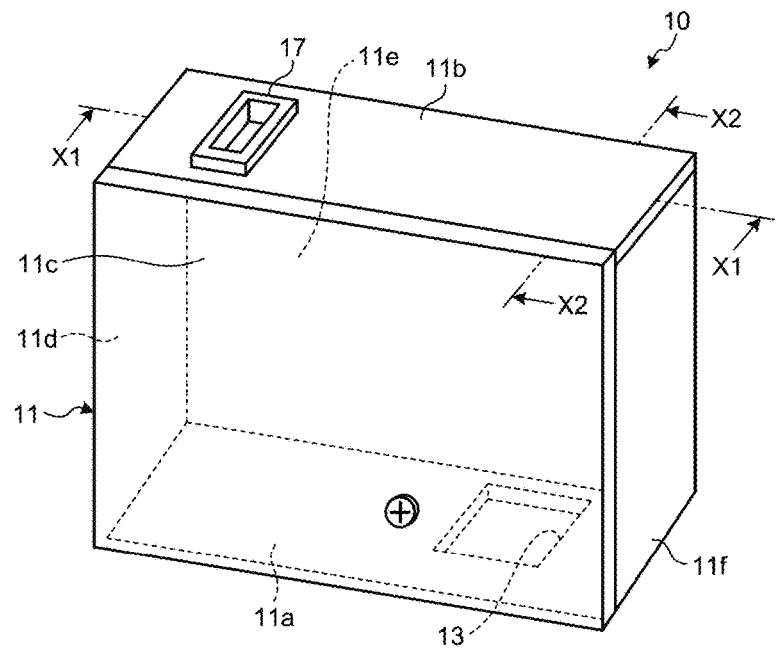
FIG. 2 is a perspective view illustrating an exterior of an image capturing system.
Figure 3:
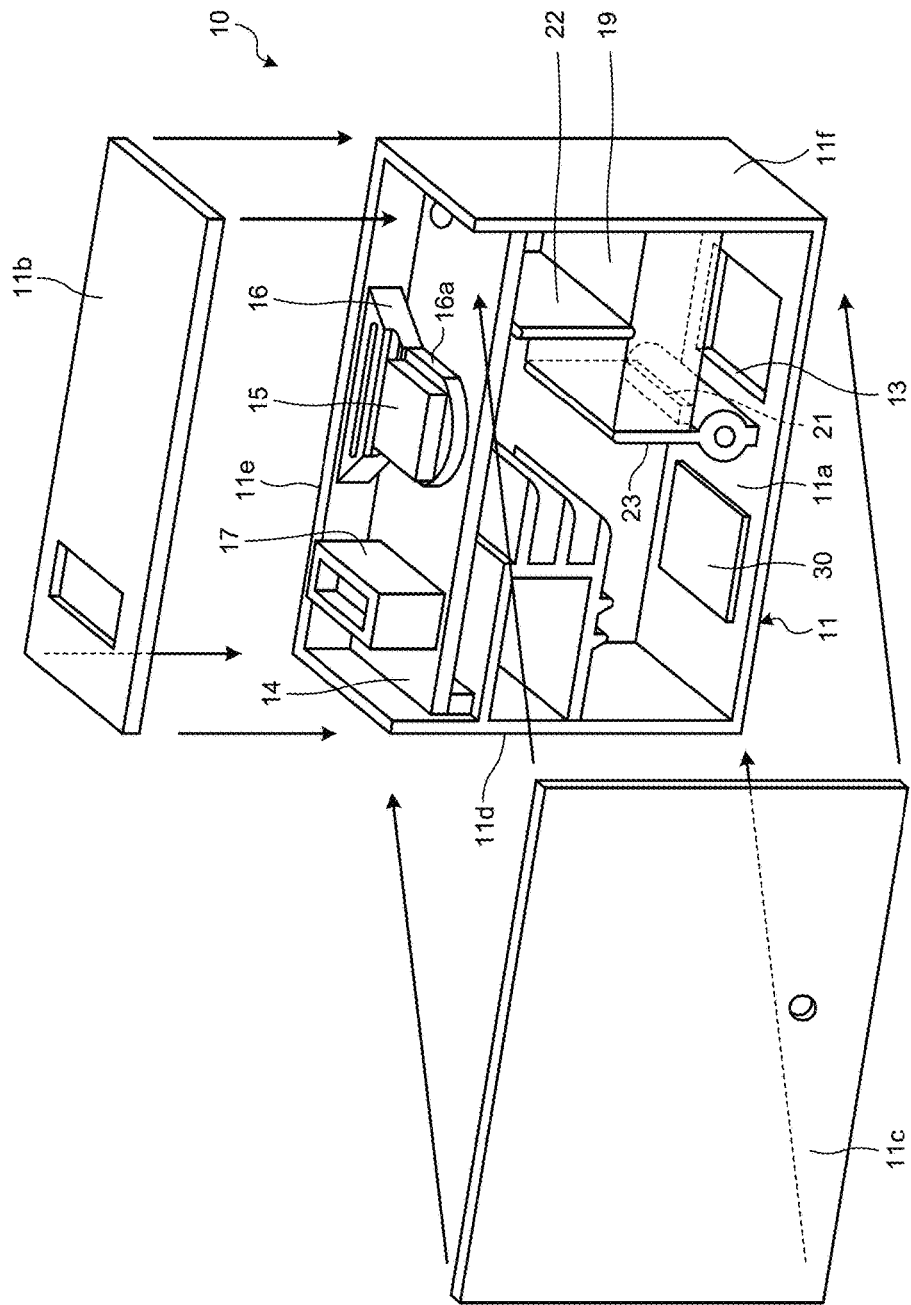
FIG. 3 is an exploded perspective view of the image capturing system.
Figure 4:
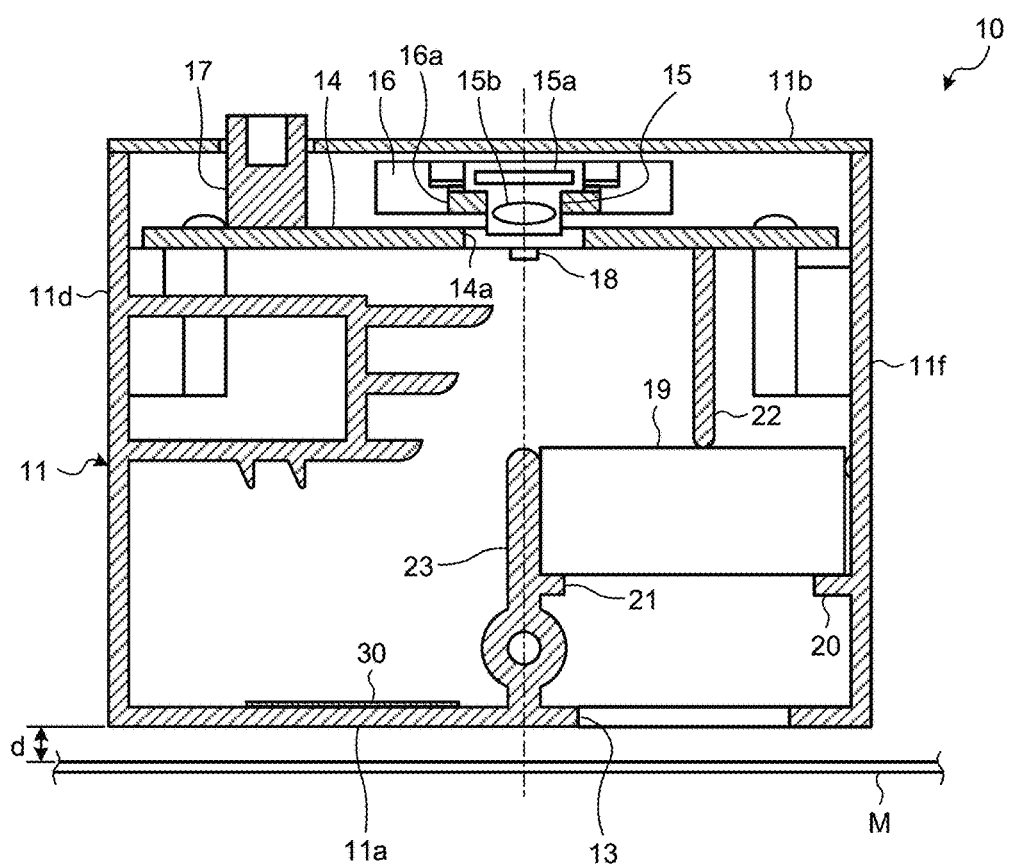
FIG. 4 is a vertical sectional view of the image capturing system when viewed from an X1 direction in FIG. 2.
Figure 5:
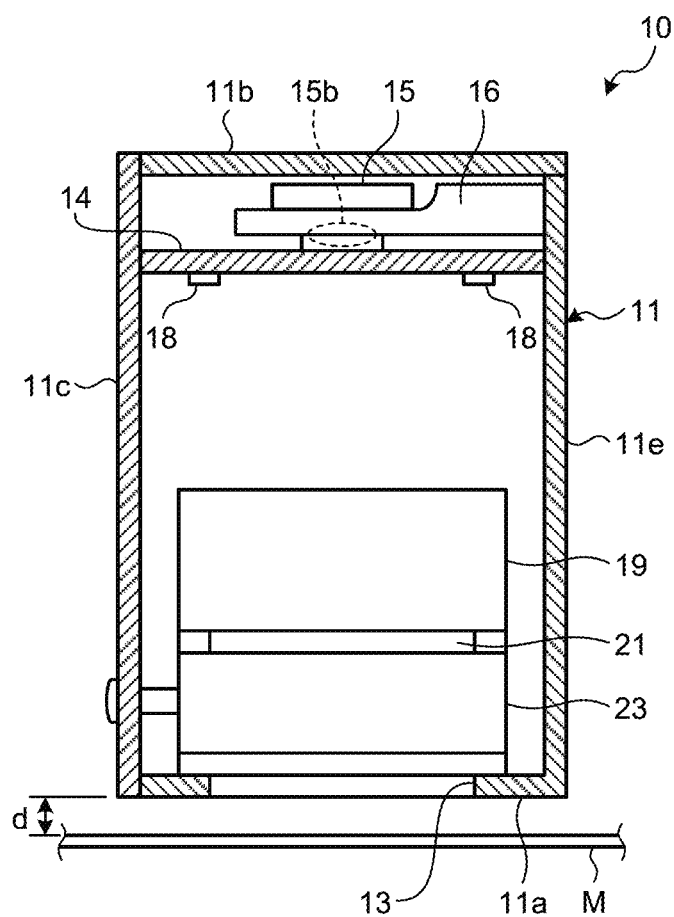
FIG. 5 is a vertical sectional view of the image capturing system when viewed from an X2 direction in FIG. 2.
Figure 6:
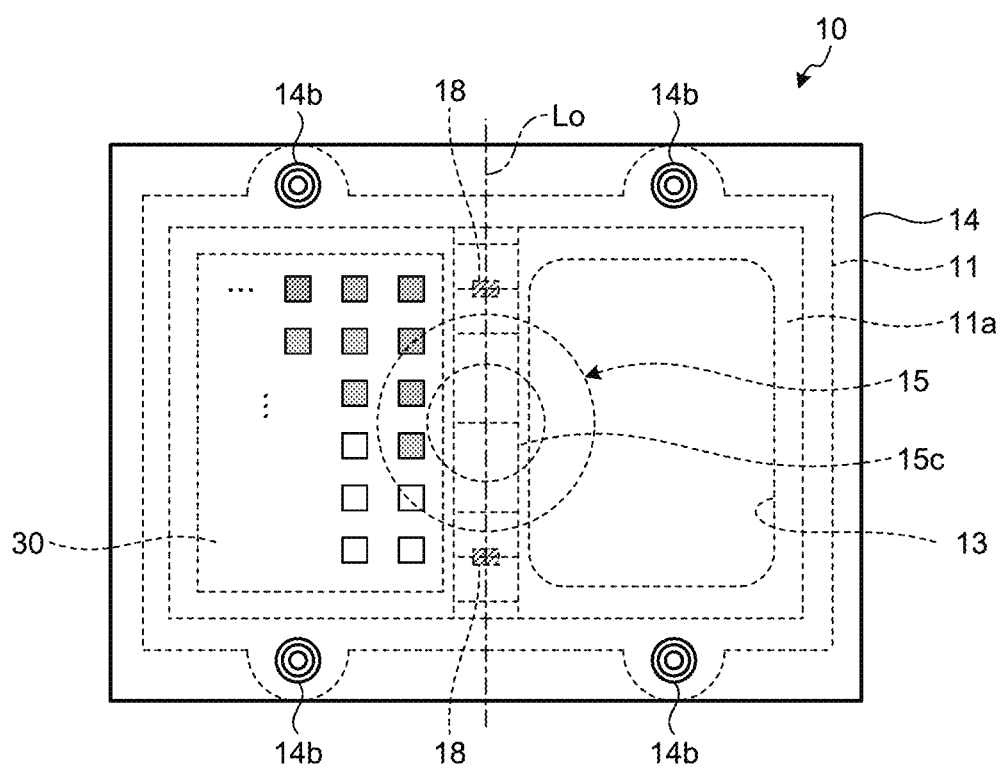
FIG. 6 is a planar view of the image capturing system.

Next, a specific example of the image capturing system 10 of the present embodiment will be described. FIG. 2 is a perspective view illustrating an exterior of the image capturing system 10. FIG. 3 is an exploded perspective view of the image capturing system 10. FIG. 4 is a vertical sectional view of the image capturing system 10 when viewed from an X1 direction in FIG. 2. FIG. 5 is a vertical sectional view of the image capturing system 10 when viewed from an X2 direction in FIG. 2. FIG. 6 is a planar view of the image capturing system 10.

For example, the image capturing system 10 includes a casing 11 that is formed in a rectangular box shape. For example, the casing 11 includes a bottom plate 11a and a top plate 11b that face each other with a predetermined interval therebetween. The casing 11 also includes side walls 11c, 11d, 11e, and 11f that join the bottom plate 11a and the top plate 11b. For example, the bottom plate 11a and the side walls 11d, 11e, and 11f of the casing 11 are integrally formed by molding, and the top plate 11b and the side wall 11c are detachably formed. FIG. 3 illustrates a state when the top plate 11b and the side wall 11c are removed.

For example, while a predetermined supporting member supports a part of the casing 11, the image capturing system 10 is installed on the conveyance path of the recording medium M on which the color pattern is formed. In this example, as illustrated in FIG. 4 and FIG. 5, the predetermined supporting member supports the image capturing system 10 so that the bottom plate 11a of the casing 11 faces the recording medium M being conveyed in a substantially parallel manner, with a gap d therebetween.

An opening 13 that makes it possible to capture an image of the color pattern outside of the casing 11 from the inside of the casing 11, is provided on the bottom plate 11a of the casing 11 that faces the recording medium M on which the color pattern is formed.

In addition, a reference chart 30 is disposed at the inner surface side of the bottom plate 11a of the casing 11, so as to be adjacent to the opening 13 via a support member 23. An image of the reference chart 30 is captured with an image of the color pattern by the image capturing device 15, which will be described below, when colorimetry is performed on the color pattern or when the RGB values of the color pattern are to be acquired. The details of the reference chart 30 will be described below.

A circuit board 14 is disposed at the top plate 11b side in the inside of the casing 11. As illustrated in FIG. 6, the casing 11 having a square box shape the surface of which at the circuit board 14 side is opened, is fixed to the circuit board 14 using fastening members 14b. For example, the shape of the casing 11 is not limited to the square box shape, and may be a cylinder shape or an oval cylinder shape having the bottom plate 11a on which the opening 13 is formed.

The image capturing device 15 that captures an image is disposed between the top plate 11b of the casing 11 and the circuit board 14. As illustrated in FIG. 4, the image capturing device 15 includes the two-dimensional sensor 15a such as a charge coupled device (CCD) sensor or a complementary metal oxide semiconductor (CMOS) sensor. The image capturing device 15 also includes a lens 15b that forms an optical image in an image capturing range of the image capturing device 15, on a light receiving surface (image capturing region) of the two-dimensional sensor 15a. The two-dimensional sensor 15a is a light receiving element array in which light receiving elements for receiving reflection light from a subject are arranged two-dimensionally.

For example, the image capturing device 15 is held by a sensor holder 16 that is integrally formed with the side wall 11e of the casing 11. The sensor holder 16 is provided with a ring unit 16a at a position facing a through hole 14a that is formed on the circuit board 14. The ring unit 16a includes a through hole the size of which matches with the external shape of a projected portion at the lens 15b side of the image capturing device 15. The image capturing device 15 is held by the sensor holder 16 so that the lens 15b faces the bottom plate 11a side of the casing 11 via the through hole 14a of the circuit board 14, by inserting the projected portion at the lens 15b side into the ring unit 16a of the sensor holder 16.

In this process, the optical axis of the image capturing device 15 that is illustrated in FIG. 4 by an alternate long and short dash line, is almost perpendicular to the bottom plate 11a of the casing 11. In addition, the image capturing device 15 is held in a state of being positioned by the sensor holder 16 so that the opening 13 and the reference chart 30, which will be described below, are included in the image capturing range. Consequently, the image capturing device 15 captures an image of the color pattern outside of the casing 11, at a part of the image capturing region of the two-dimensional sensor 15a, via the opening 13. In addition, the image capturing device 15 can capture an image of the reference chart 30 that is disposed inside the casing 11, at another part of the image capturing region of the two-dimensional sensor 15a.

For example, the image capturing device 15 is electrically connected to the circuit board 14 on which various electronic components are mounted, via a flexible cable. In addition, the circuit board 14 includes an external connection connector 17 on which a connection cable for connecting the image capturing system 10 with a main control board of the image forming device 100 is mounted.

In the image capturing system 10, a pair of light sources 18 are arranged on the circuit board 14, on a center line Lo that passes through the center of the image capturing device 15 in a sub-scanning direction, as well as at respective positions away from the center of the image capturing device 15 at equal intervals of a certain amount in the sub-scanning direction. The light sources 18 illuminate the image capturing range of the image capturing device 15 almost uniformly, while the image capturing device 15 is capturing an image. For example, light emitting diodes (LEDs) that can save space and power are used as the light sources 18.

In the present embodiment, as illustrated in FIG. 5 and FIG. 6, a pair of LEDs that are uniformly arranged in a direction orthogonal to a direction toward which the opening 13 and the reference chart 30 are arranged, with reference to the center of the lens 15b, are used as the light sources 18.

For example, two of the LEDs that are used as the light sources 18 are mounted on a surface of the bottom plate 11a side of the circuit board 14. However, the light sources 18 may not be directly mounted on the circuit board 14, as long as the light sources 18 are disposed on the positions where the light sources 18 can illuminate the image capturing range of the image capturing device 15 almost uniformly with diffused light. In addition, the two LEDs are arranged at symmetrical positions with respect to the center of the two-dimensional sensor 15a. Thus, an image of the image capturing surface can be captured under the same illumination condition as that of the reference chart 30 side. In addition, in the present embodiment, the LED is used for each of the light sources 18. However, the type of the light sources 18 is not limited to the LED. For example, an organic electroluminescence (EL) may be used as the light sources 18. When the organic EL is used as the light sources 18, it is possible to obtain illumination light close to the spectral distribution of solar light. Hence, an improvement in colorimetric accuracy can be expected.

In addition, as illustrated in FIG. 6, the image capturing device 15 includes a light-absorbing body 15c directly below the light sources 18 and the two-dimensional sensor 15a. The light-absorbing body 15c reflects or absorbs the light from the light sources 18 in a direction other than that of the two-dimensional sensor 15a. The light-absorbing body 15c is formed so that the incident light from the light sources 18 is reflected toward the inner surface of the light-absorbing body 15c in an acute manner, but does not reflect in the incident direction.

In the inside of the casing 11, an optical path length changing member 19 is disposed on an optical path between the image capturing device 15 and a color pattern outside of the casing 11 the image of which is to be captured by the image capturing device 15 via the opening 13. The optical path length changing member 19 is an optical element with a refractive index n that has a sufficient transmittance relative to the light from the light sources 18. The optical path length changing member 19 has a function of bringing an image forming surface of an optical image of a color pattern outside of the casing 11 close to an image forming surface of an optical image of the reference chart 30 inside of the casing 11. In other words, in the image capturing system 10, the optical path length is changed by disposing the optical path length changing member 19 on the optical path, between the image capturing device 15 and a subject outside of the casing 11. Consequently, in the image capturing system 10, the image forming surface of the optical image of the color pattern outside of the casing 11 and the image forming surface of the reference chart 30 inside of the casing 11 are both matched on the light receiving surface of the two-dimensional sensor 15a of the image capturing device 15. Thus, the image capturing device 15 can capture an image focused on both the color pattern outside of the casing 11 as well as the reference chart 30 inside of the casing 11.

For example, as illustrated in FIG. 4, a pair of ribs 20 and 21 support both ends of the surface of the optical path length changing member 19 at the bottom plate 11a side. In addition, the optical path length changing member 19 does not move in the casing 11, because a pressing member 22 is disposed between the surface of the optical path length changing member 19 at the top plate 11b side, and the circuit board 14. The optical path length changing member 19 is disposed so as to close the opening 13 that is provided on the bottom plate 11a of the casing 11. Thus, the optical path length changing member 19 also has a function of preventing impurities such as ink mist and dust that enter inside of the casing 11 from the outside of the casing 11 via the opening 13, from adhering to the image capturing device 15, the light sources 18, the reference chart 30, and the like.

The mechanical configuration of the image capturing system 10 described above is merely an example, and is not limited thereto. The image capturing system 10 may at least capture an image of the color pattern outside of the casing 11 via the opening 13, using the image capturing device 15 provided inside the casing 11, while the light sources 18 provided inside the casing 11 are turned on. Various modifications and changes may be made on the above configuration of the image capturing system 10.

For example, in the image capturing system 10 described above, the reference chart 30 is disposed on the inner surface side of the bottom plate 11a of the casing 11. However, it is not limited thereto, and an opening different from the opening 13 may be provided on the position where the reference chart 30 is disposed on the bottom plate 11a of the casing 11, and the reference chart 30 may be fixed to the position where the opening is provided, from the outside of the casing 11. In this case, the image capturing device 15 captures an image of the color pattern that is formed on the recording medium M via the opening 13, and also captures an image of the reference chart 30 that is fixed to the bottom plate 11a of the casing 11 from the outside, via the opening different from the opening 13. In this example, if the reference chart 30 is damaged by stain and the like, the reference chart 30 can be easily replaced.

Figure 7:
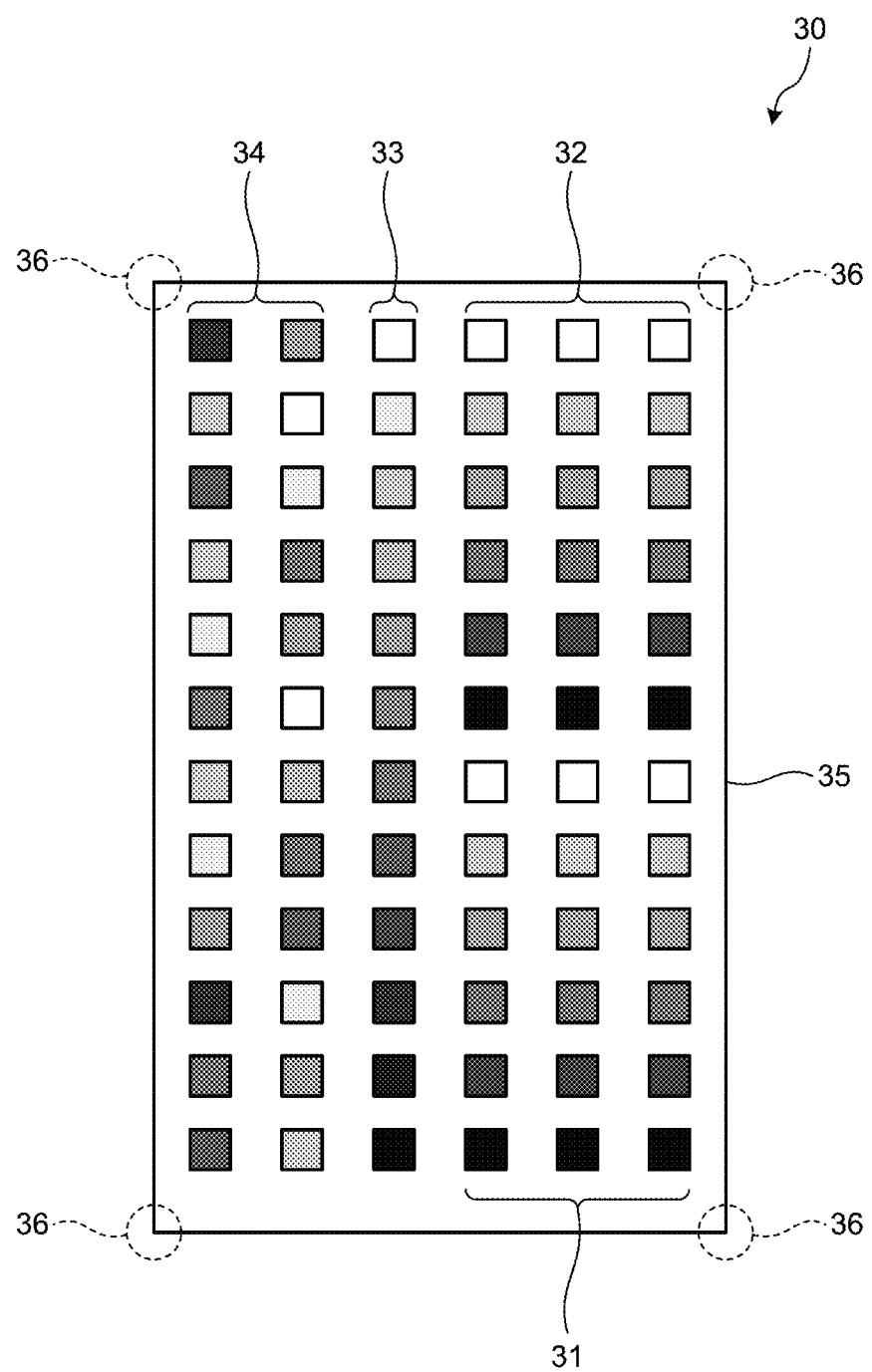
FIG. 7 is a diagram illustrating a specific example of a reference chart.

Next, a specific example of the reference chart 30 disposed in the casing 11 of the image capturing system 10 will be described with reference to FIG. 7. FIG. 7 is a diagram illustrating a specific example of the reference chart 30.

The reference chart 30 illustrated in FIG. 7 includes a plurality of colorimetric patch arrays 31 to 34 in which colorimetric patches used for performing colorimetry are arranged, a distance measurement line 35, and a chart position specification marker 36.

The colorimetric patch arrays 31 to 34 include the colorimetric patch array 31 in which the colorimetric patches of the primary colors of yellow, magenta, cyan, and black (YMCK) are arranged in the order of gradation; the colorimetric patch array 32 in which the colorimetric patches of the secondary colors of RGB are arranged in the order of gradation; the colorimetric patch array (achromatic gradation pattern) 33 in which the colorimetric patches of the gray scale are arranged in the order of gradation; and the colorimetric patch array 34 in which the colorimetric patches of tertiary colors are arranged.

The distance measurement line 35 is formed as a rectangular frame that surrounds the colorimetric patch arrays 31 to 34. The chart position specification marker 36 is placed at the four corners of the distance measurement line 35, and functions as a marker for specifying the position of each of the colorimetric patches. Hence, it is possible to specify the position of the reference chart 30 as well as the position of each of the colorimetric patches, by specifying the distance measurement line 35 and the chart position specification markers 36 at the four corners of the distance measurement line 35, from an image of the reference chart 30 that is to be captured by the image capturing device 15.

The colorimetric patches that configure the colorimetric patch arrays 31 to 34 for performing colorimetry are used as references for colors that are reflecting the image capturing conditions of the image capturing device 15. The configuration of the colorimetric patch arrays 31 to 34 for performing colorimetry that are disposed in the reference chart 30 is not limited to the example illustrated in FIG. 7, and any colorimetric patch array may be applied. For example, colorimetric patches that can specify the color range as broadly as possible may be used. In addition, the colorimetric patch array 31 of the primary colors of YMCK or the colorimetric patch array 33 of the gray scale may be configured using patches having colorimetric values of coloring materials that are used in the image forming device 100. Furthermore, the colorimetric patch array 32 of the secondary colors of RGB may be configured using patches having colorimetric values capable of producing colors by the coloring materials that are used in the image forming device 100. A reference color chart in which the colorimetric values are defined such as Japan Color may also be used for the colorimetric patch array 32 of the secondary colors of RGB.

In the present embodiment, the reference chart 30 includes the colorimetric patch arrays 31 to 34 including the patches (color chips) having a general shape. However, the reference chart 30 does not necessarily include the colorimetric patch arrays 31 to 34 as described above. The reference chart 30 may have a configuration in which a plurality of colors that can be used for colorimetry are disposed so that the location of each of the colors can be specified.

As described above, the reference chart 30 is disposed adjacent to the opening 13 at the inner surface side of the bottom plate 11a of the casing 11. Thus, the image capturing device 15 can capture an image of the reference chart 30 as well as an image of the color pattern outside of the casing 11 at the same time. In this example, the images are captured at the same time, when the image capturing device 15 acquires image data of a single frame including the color pattern outside of the casing 11 and the reference chart 30. In other words, as long as the image capturing device 15 acquires image data in which the color pattern outside of the casing 11 and the reference chart 30 are included in a single frame, it is assumed that the images of the color pattern outside of the casing 11 and the reference chart 30 are captured at the same time, even if a time difference occurs in the acquisition of data in each pixel. In other words, as long as the color pattern outside of the casing 11 and the reference chart 30 are disposed at the positions where the images can be captured at the same time, there is no need to use images of the color pattern outside of the casing 11 and the reference chart 30 that are captured at the same time.

Figure 8:
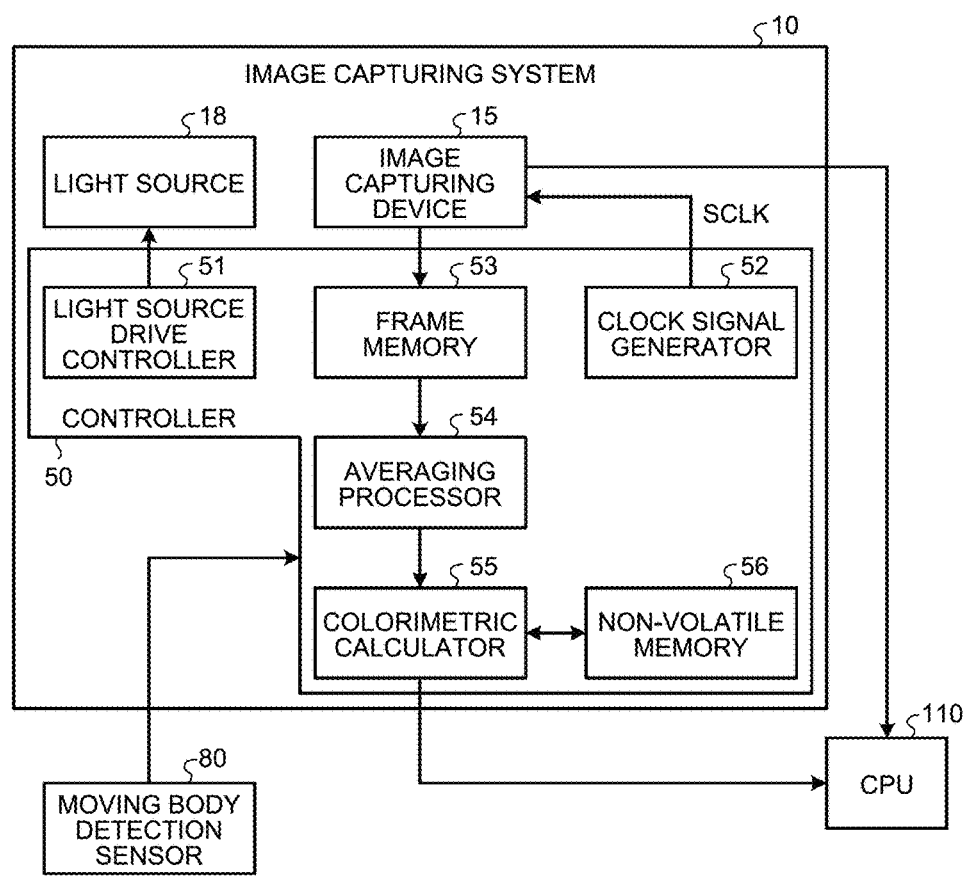
FIG. 8 is a block diagram illustrating a functional configuration example of the image capturing system.

Next, a functional configuration of the image capturing system 10 will be described with reference to FIG. 8. FIG. 8 is a block diagram illustrating a functional configuration example of the image capturing system 10.

As illustrated in FIG. 8, the image capturing system 10 includes a controller 50. The controller 50 supplies a system clock (SCLK), receives a vertical synchronizing signal (VSYNC), a horizontal synchronizing signal (HSYNC), and image data from the image capturing device 15, and processes the received image data.

The controller 50 includes a light source drive controller 51, a clock signal generator 52, a frame memory 53, an averaging processor 54, a colorimetric calculator 55, and a non-volatile memory 56. For example, the units are implemented using a computer system including a processor and memory, or dedicated hardware such as a field-programmable gate array (FPGA) and an application specific integrated circuit (ASIC). For example, hardware that implements the functions of the units is mounted on the circuit board 14 that is disposed inside of the casing 11 in the image capturing system 10.

The image capturing device 15 converts the light that has entered via the lens 15b to an electrical signal using the two-dimensional sensor 15a, and outputs image data in the image capturing range that is illuminated by the light source 18. The image capturing device 15 performs an analog-to-digital conversion on an analog signal that is obtained by photoelectric conversion performed by the two-dimensional sensor 15a, and converts the analog signal to digital image data. The image capturing device 15 performs various types of image processing such as shading correction, white balance correction, gamma (γ) correction, and format conversion on the image data, and outputs the image data. For example, the settings of various operation conditions of the two-dimensional sensor 15a are performed according to various setting signals from a central processing unit (CPU) 110 mounted on the main control board of the image forming device 100. A part or all of the various types of image processing performed on the image data may be performed outside of the image capturing device 15.

When an image is captured by the image capturing device 15, the light source drive controller 51 generates a light source drive signal for turning on the light sources 18, and supplies the light source drive signal to the light sources 18.

The clock signal generator 52 generates a system clock (SCLK) signal for controlling the timing to start capturing an image by the image capturing device 15, and supplies the system clock (SCLK) signal to the image capturing device 15. The clock signal generator 52 functions as a controller that switches from stop supplying to supplying a system clock (SCLK) used for controlling the timing to start capturing an image by the image capturing device 15.

Figure 9:
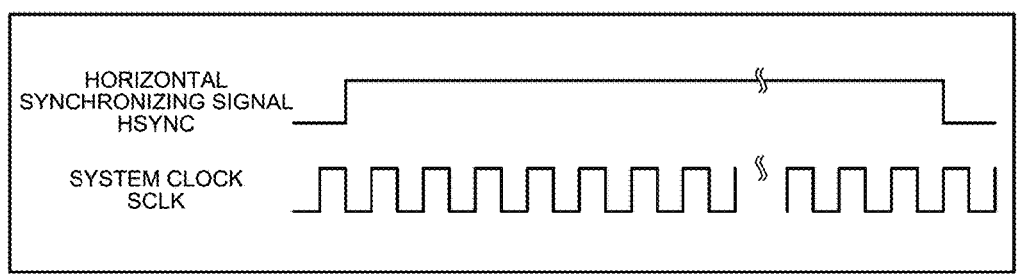
FIG. 9 is a diagram for explaining a relation between a system clock (SCLK) and a horizontal synchronizing signal (HSYNC)

FIG. 9 is a diagram for explaining a relation between the system clock (SCLK) and the horizontal synchronizing signal (HSYNC). As illustrated in FIG. 9, the horizontal synchronizing signal (HSYNC) is output from the image capturing device 15, based on the number of system clocks for horizontal pixels that are supplied from the clock signal generator 52.

Figure 10:
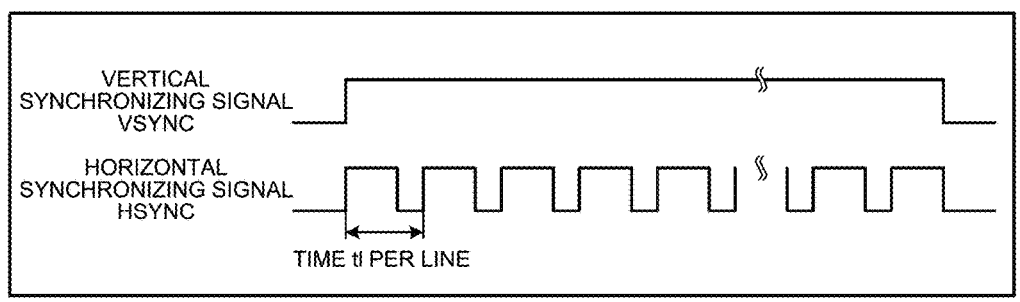
FIG. 10 is a diagram for explaining a relation between the horizontal synchronizing signal (HSYNC) and a vertical synchronizing signal (VSYNC)

FIG. 10 is a diagram for explaining a relation between the horizontal synchronizing signal (HSYNC) and the vertical synchronizing signal (VSYNC). As illustrated in FIG. 10, the vertical synchronizing signal (VSYNC) is output from the image capturing device 15, based on the number of clocks of horizontal synchronizing signals (HSYNC) for vertical pixels.

Figure 11:
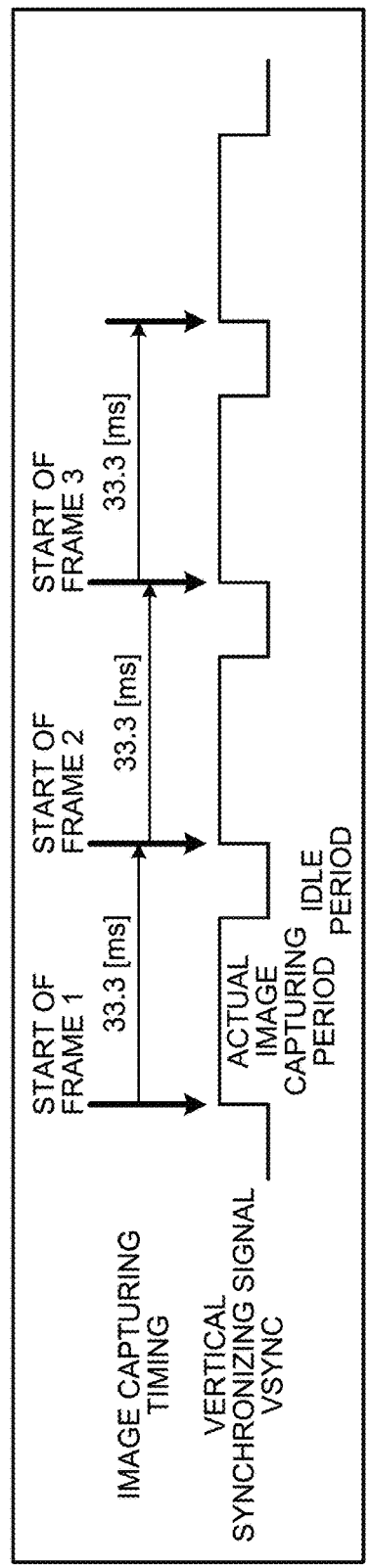
FIG. 11 is a diagram for explaining a relation between the vertical synchronizing signal (VSYNC) and an image capturing (frame) cycle.

FIG. 11 is a diagram for explaining a relation between the vertical synchronizing signal (VSYNC) and an image capturing (frame) cycle. As illustrated in FIG. 11, a single cycle of the vertical synchronizing signal (VSYNC) is an image capturing (frame) cycle of a single screen in the image capturing device 15. As illustrated in FIG. 11, the frame cycle includes a vertical synchronizing signal=H (actual image capturing period) and a vertical synchronizing signal=L (idle period). During the idle period, internal operation processing such as gamma conversion is performed on the frame data inside the sensor. In the present embodiment, the frame cycle is 33.3 [ms]=[frame per sec (fps)].

The frame memory 53 temporarily stores therein an image output from the image capturing device 15.

The averaging processor 54 extracts an image region that is sectioned by the opening 13 of the casing 11 (hereinafter, this image region is referred to as a "subject image region"), as well as an image region of the reference chart 30 (hereinafter, this image region is referred to as a "reference chart image region"), from the image that is output from the image capturing device 15 and that is temporarily stored in the frame memory 53, when colorimetry is performed on the color pattern. The averaging processor 54 then averages the image data in the region, the size of which is determined in advance, in the center portion of the subject image region, and outputs the obtained value as the RGB values of the color pattern. In addition, the averaging processor 54 averages the image data in the region of the colorimetric patches within the reference chart image region, and outputs the obtained values as the RGB values of the colorimetric patches. The RGB values of the color pattern and the RGB values of the colorimetric patches in the reference chart 30 are passed to the colorimetric calculator 55.

The colorimetric calculator 55 that is a colorimetric calculator calculates colorimetric values of the color pattern, based on the RGB values of the color pattern and the RGB values of the colorimetric patches in the reference chart 30 that are obtained from the averaging processor 54. The colorimetric values of the color pattern calculated by the colorimetric calculator 55 are sent to the CPU 110 that is mounted on the main control board of the image forming device 100. For example, the colorimetric calculator 55 can calculate the colorimetric values of the color pattern, using a method disclosed in Japanese Patent No. 5625666. Consequently, detailed description of the processing performed by the colorimetric calculator 55 will be omitted herein. In addition, the RGB values of the colorimetric patches in the reference chart 30 may also be used for drive control such as correction of an error caused by the change in the light source 18, adjusting the white balance in the two-dimensional sensor 15a such as the CMOS sensor, and the gamma correction.

The non-volatile memory 56 stores therein various types of data required for calculating colorimetric values of the color pattern that is performed by the colorimetric calculator 55.

The image capturing system 10 configured as the above is disposed on the conveyance path of the recording medium M on which the color pattern is formed by the main body unit 101 of the image forming device 100. For example, the image capturing system 10 is disposed on the conveyance path of the recording medium M in the finisher 105 of the image forming device 100. When the recording medium M on which the color pattern is formed is discharged from the main body unit 101, the image capturing system 10 turns on the light sources 18. In the image capturing system 10, the image capturing device 15 then captures an image of the color pattern, at the timing when the color pattern on the recording medium M is brought to the position facing the opening 13 that is provided in the casing 11, when the recording medium M is being conveyed. In the image capturing system 10, the colorimetric calculator 55 calculates the colorimetric values of the color pattern, based on the image captured by the image capturing device 15. The calculated colorimetric values are then sent to the CPU 110 or the like that is mounted on the main control board of the image forming device 100. Then, based on the control by the CPU 110, color adjustment is performed in the main body unit 101 of the image forming device 100, according to the colorimetric values obtained based on the image capturing result of the color pattern.

The color adjustment in the main body unit 101 of the image forming device 100 may also be performed using the RGB values of the color pattern that are obtained from the captured image, as described above. In this case, in the image capturing system 10, the image capturing device 15 captures the image of the color pattern as well as the image of the reference chart 30. In the image capturing system 10, a process of correcting an error caused by the change in the light source 18 or the like is performed on the RGB values of the color pattern obtained from the captured image, using the RGB values of the colorimetric patches of the reference chart 30. For example, the corrected RGB values of the color pattern are sent to the CPU 110 or the like that is mounted on the main control board in the image forming device 100, and is used for color adjustment in the main body unit 101.

Next, control performed by the clock signal generator 52 to stop or resume the system clock (SCLK) signal will now be described.

Figure 12:
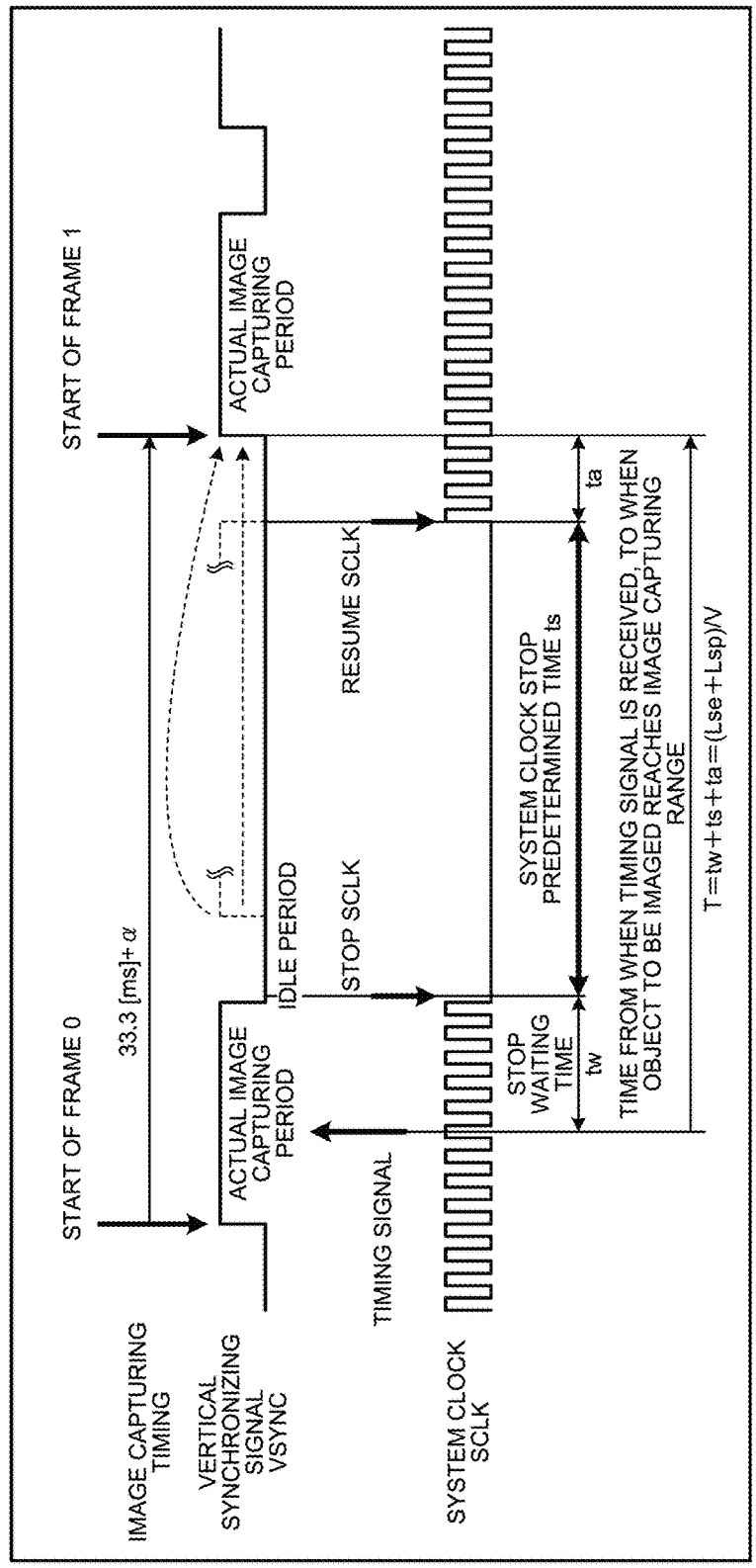
FIG. 12 is a timing chart illustrating a relation between signals when a timing signal is supplied from a moving body detection sensor, during an image capturing (frame) cycle of a single screen.

FIG. 12 is a timing chart illustrating a relation between signals when a timing signal is supplied from the moving body detection sensor 80, during an image capturing (frame) cycle of a single screen. FIG. 12 illustrates a relation between signals when a timing signal from the moving body detection sensor 80 is supplied to the controller 50 during the actual image capturing period. In addition, FIG. 13 is a schematic view illustrating a positional relation between the moving body detection sensor 80 and a moving body (recording medium M).

Figure 13:
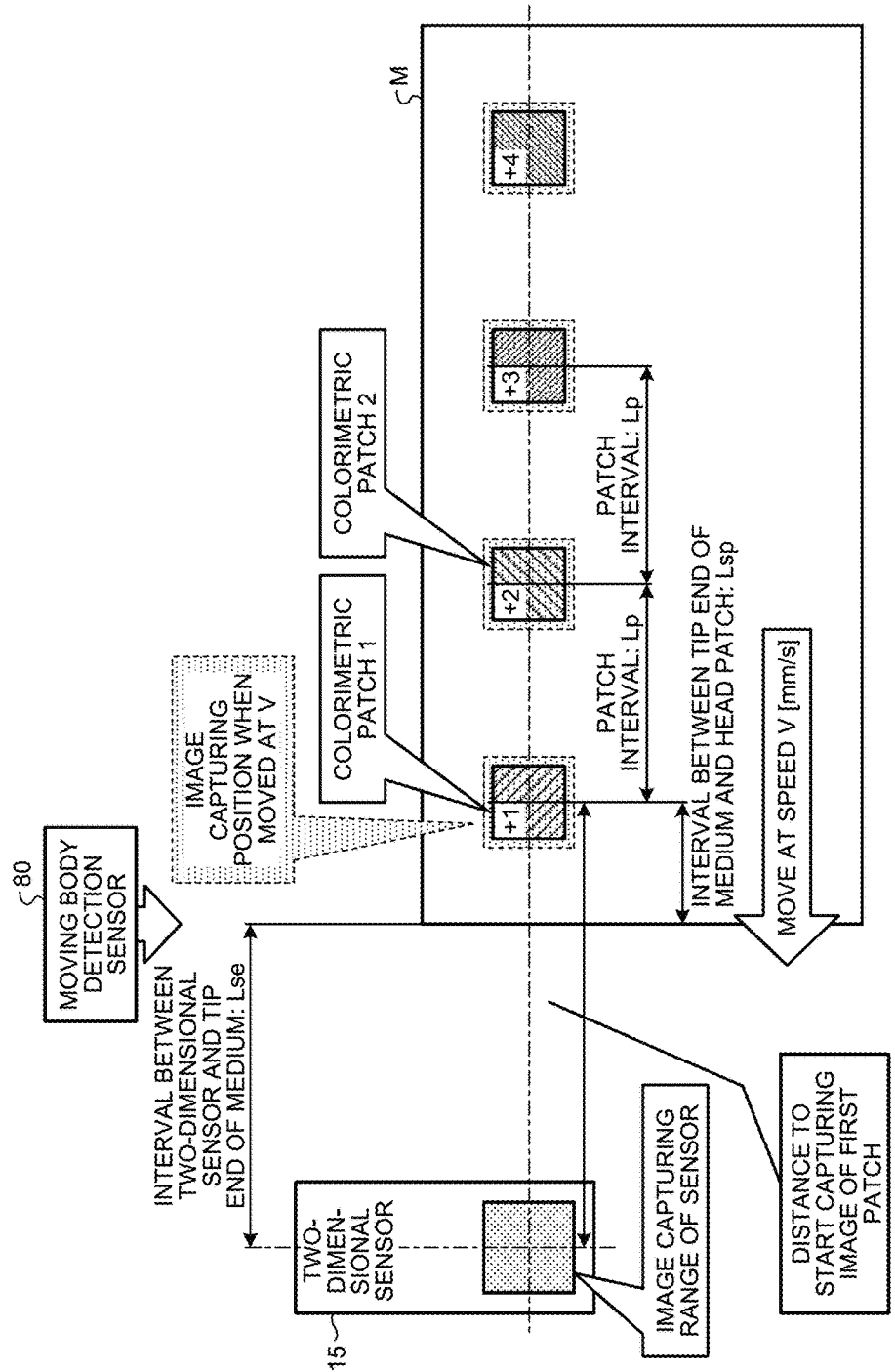
FIG. 13 is a schematic view illustrating a positional relation between the moving body detection sensor and a moving body.

The timing signal illustrated in FIG. 12 indicates the timing when the recording medium M has passed the moving body detection sensor 80, as illustrated in FIG. 13. In this example, the recording medium M is moving at a known speed V (mm/s). In addition, an interval between the image capturing device 15 and the tip end of the recording medium M is Lse.

As illustrated in FIG. 12, when a timing signal is supplied from the moving body detection sensor 80, the clock signal generator 52 waits for an interruption of the subsequent end of frame capture (completion of actual image capturing period).

In this example, as illustrated in FIG. 13, distance between the tip end of the recording medium M and the position of a colorimetric patch 1 at the head is Lsp. When a timing signal is supplied to the controller 50 from the moving body detection sensor 80, the colorimetric patch 1 the image of which is to be captured by the image capturing device 15 is located at distance of Lse+Lsp from the image capturing device 15, and is moving at a certain speed V. In other words, a time T from when a timing signal is supplied to the clock signal generator 52 to when the colorimetric patch 1 reaches the center position of the image capturing device 15 can be expressed by the following formula.

$$T=(Les+Lsp)/V$$

Thus, when the subsequent actual image capturing period starts in T seconds after a timing signal is supplied to the clock signal generator 52, the image of the colorimetric patch 1 is captured at the center of the image capturing range of the image capturing device 15.

Upon receiving the completion of the actual image capturing period, the clock signal generator 52 stops supplying the system clock (SCLK) from the clock signal generator 52 to the image capturing device 15. In this process, the image capturing device 15 is in L (idle period) of the vertical synchronizing signal (VSYNC). The idle period is a fixed period. Thus, the signal (clock) supply may be stopped at any timing during the idle period. In the present embodiment, the signal supply is immediately stopped to simplify the explanation.

The clock signal generator 52 stores therein a time from when a timing signal is supplied, to when the system clock (SCLK) is stopped from being supplied to the image capturing device 15, by the interruption of the end of frame capture (stop waiting time: tw) (more precisely, the number of system clocks of the CPU).

The clock signal generator 52 manages how many pulses from the start of supply of the system clock (SCLK) to the start of the image capturing (frame) cycle. In the present embodiment, the signal (clock) supply is stopped immediately after the start of an idle period ta which is the period from the start of supply of the system clock (SCLK) to the start of the image capturing (frame) cycle. In this process, ts is a time during which the system clock is stopped from being supplied to the image capturing device 15, the predicted time T required for the colorimetric patch 1 to reach the center position of the image capturing device 15 can be expressed by the following formula:

$$T=(Les+Lsp)/V=tw+ts+ta.$$

In other words, the system clock stop time ts can be expressed by the following formula:

$$ts=(Les+Lsp)/V-tw-ta.$$

After stop supplying the system clock (SCLK) to the image capturing device 15, the clock signal generator 52 performs the above calculation process, and resumes supplying the system clock (SCLK) to the image capturing device 15, after the system clock stop time ts has elapsed.

In this manner, the clock signal generator 52 can make the colorimetric patch 1 reach the center in the image capturing range of the image capturing device 15, after the supply of the system clock (SCLK) is resumed. In other words, the image capturing device 15 can capture an image of the colorimetric patch 1 by positioning the colorimetric patch 1 at the center, as the image of the first frame.

The colorimetric patches of the second colorimetric patch and thereafter are formed as follows.

As described above, the frame cycle is 33.3 [ms]. Thus, distance Lp that the recording medium M moves at the speed V can be expressed by the following formula.

$$Lp=0.033*V[mm]$$

In other words, in the color pattern, the second patch interval and thereafter in the colorimetric patch arrays 31 to 34, has the distance Lp where the recording medium M moves at the speed V. Consequently, the clock signal generator 52 can make the second colorimetric patch and thereafter in the colorimetric patch arrays 31 to 34 sequentially reach the center in the image capturing range of the image capturing device 15, without performing a special timing control.

In the present embodiment, the timing signal is directly supplied from the moving body detection sensor 80. However, it is not limited thereto, and the timing signal may be communicated using a communication standard such as a serial peripheral interface (SPI) via another CPU.

In this manner, in the present embodiment, after the system clock is stopped from being supplied, the supply of the system clock to the image capturing device 15 is resumed according to the relative movement of the object to be imaged (colorimetric patch 1 of the color pattern formed on the recording medium M), based on the predetermined relative position detected by the moving body detection sensor 80. Consequently, it is possible to synchronize the object to be imaged (color pattern formed on the recording medium M) with the image capturing timing of the image capturing device 15, and capture an image of a target location in the object to be imaged with high accuracy.

In the present embodiment, as illustrated in FIG. 12, the clock signal generator 52 immediately stops supplying the system clock (SCLK) to the image capturing device 15, upon receiving the completion of the actual image capturing period. However, it is not limited thereto.

Figure 14:
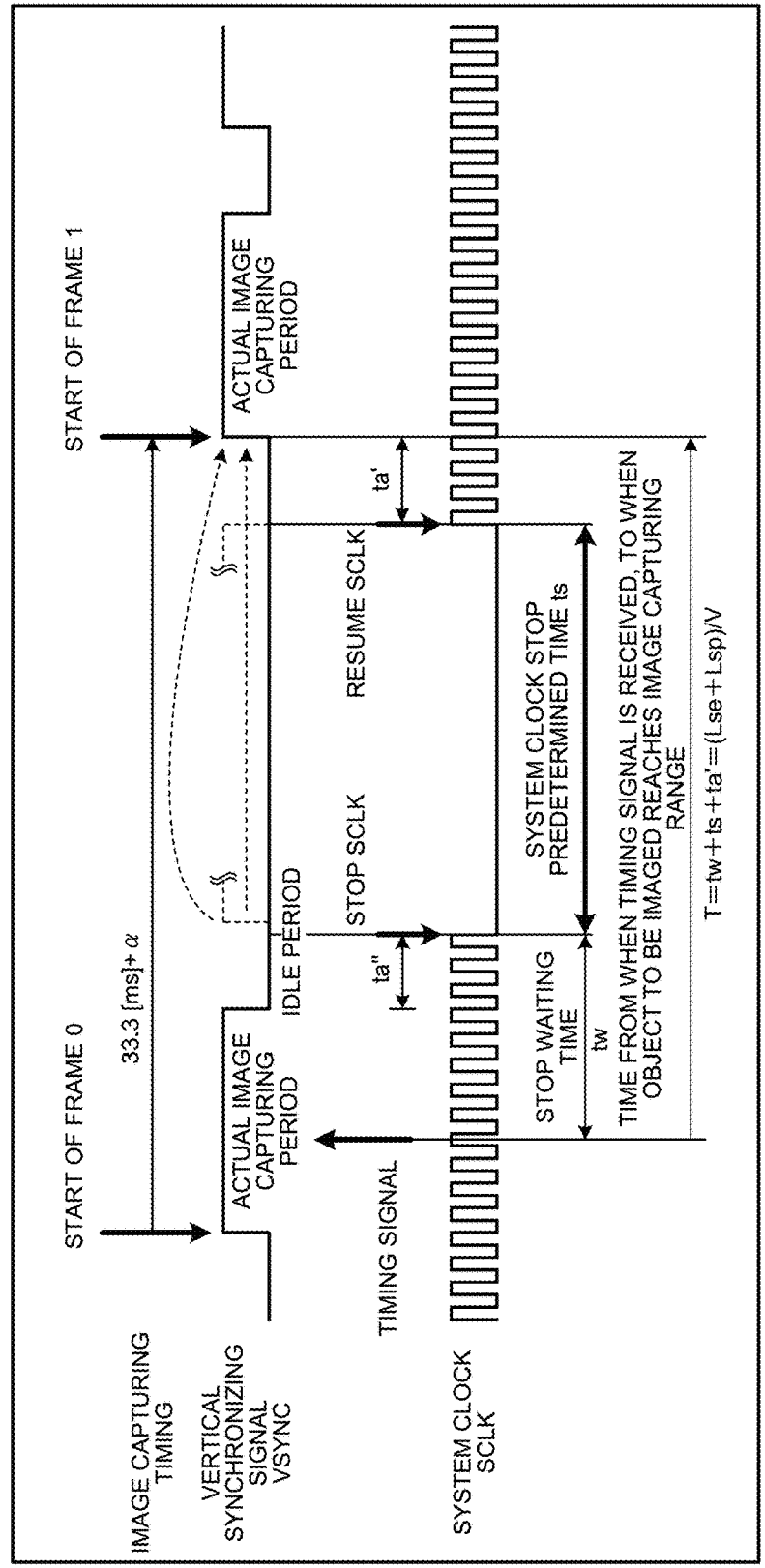
FIG. 14 is a timing chart illustrating a modification of the relation between signals when a timing signal is supplied from the moving body detection sensor, during an image capturing (frame) cycle of a single screen.

In this example, FIG. 14 is a timing chart illustrating a modification of the relation between the signals when a timing signal is supplied from the moving body detection sensor 80, during an image capturing (frame) cycle of a single screen. For example, as illustrated in FIG. 14, the clock signal generator 52 may stop supplying the system clock (SCLK) to the image capturing device 15, after entering the idle period that is not the actual image capturing period of the image capturing device 15.

In the process, the clock signal generator 52 stores therein time (stop waiting time: tw) from when a timing signal is supplied, to when the system clock (SCLK) is stopped from being supplied to the image capturing device 15 by the interruption of the end of frame capture (stop waiting time: tw) (more precisely, the number of system clocks of the CPU).

The clock signal generator 52 manages how many pulses from the start of the idle period to the stop of the system clock (SCLK). For convenience, the period of the pulses is referred to as ta". Since the idle period to is known, the clock signal generator 52 also manages how many pulses from the start of supply of the next system clock (SCLK) to the start of the image capturing (frame) cycle. Here, the period from the start of supply of the next system clock (SCLK) to the start of the image capturing (frame) cycle is referred to as ta'. The idle period ta can be expressed by the following formula:

$$ta=ta'+ta''.$$

Here, ts is a time during which the system clock is stopped from being supplied to the image capturing device 15, the predicted time T required for the colorimetric patch 1 to reach the center position of the image capturing device 15 can be expressed by the following formula:

$$T=(Les+Lsp)/V=tw+ts+ta'.$$

In other words, the system clock stop time ts can be expressed by the following formula:

$$ts=(Les+Lsp)/V-tw-ta'.$$

After stop supplying the system clock (SCLK) to the image capturing device 15, the clock signal generator 52 performs the above calculation process, and resumes supplying the system clock (SCLK) to the image capturing device 15, after the system clock stop time ts has elapsed.

Thus, the clock signal generator 52 can make the colorimetric patch 1 reach the center in the image capturing range of the image capturing device 15, after the supply of the system clock (SCLK) is resumed. In other words, the image capturing device 15 can capture an image of the colorimetric patch 1 by positioning the colorimetric patch 1 at the center, as the image of the first frame.

In the present embodiment, as illustrated in FIG. 12, the timing signal is received from the moving body detection sensor 80, while the clock signal generator 52 is supplying the system clock (SCLK) to the image capturing device 15. However, it is not limited thereto.

Figure 15:
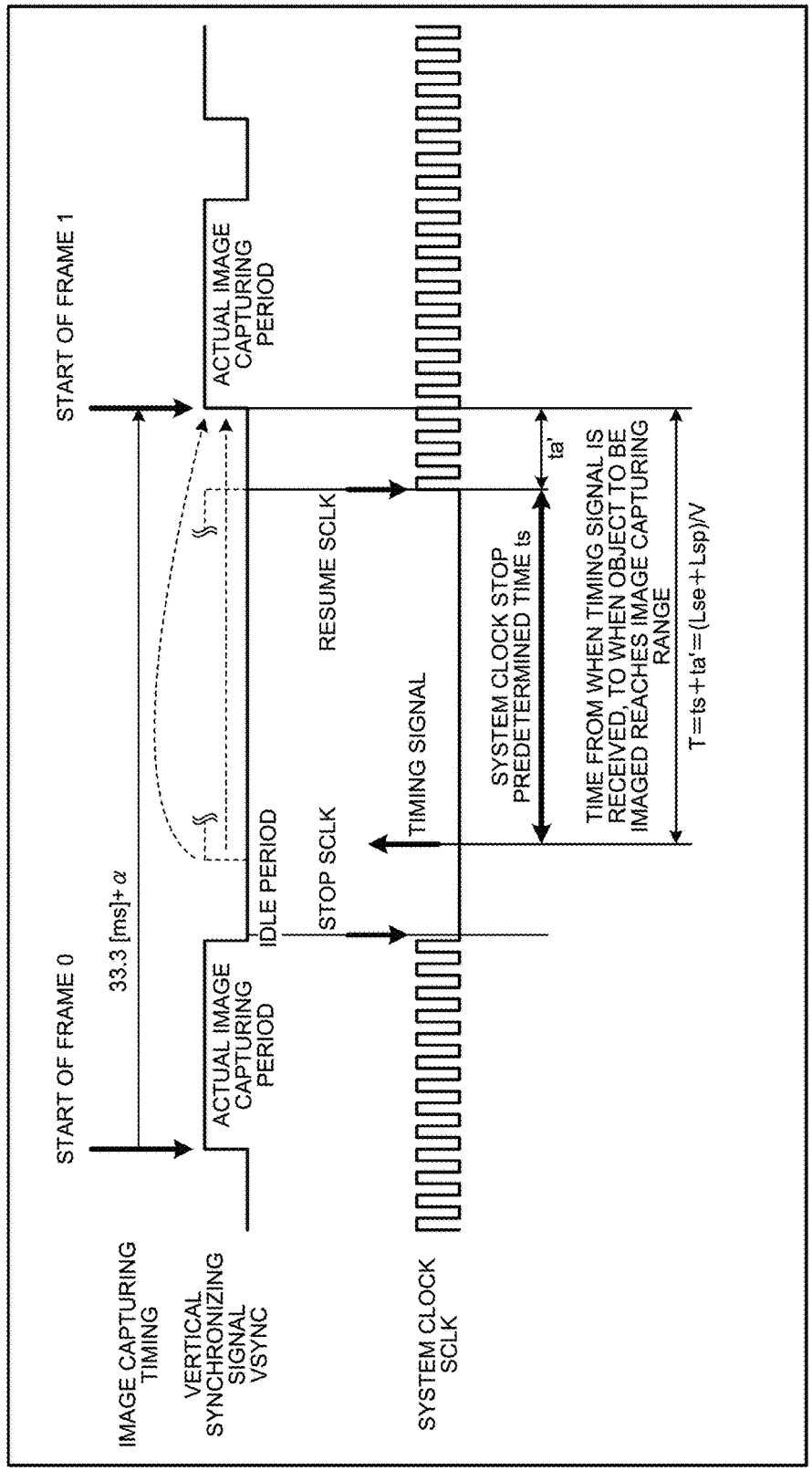
FIG. 15 is a timing chart illustrating another modification of the relation between signals when a timing signal is supplied from the moving body detection sensor, during an image capturing (frame) cycle of a single screen.

FIG. 15 is a timing chart illustrating another modification of the relation between signals when a timing signal is supplied from the moving body detection sensor 80, during an image capturing (frame) cycle of a single screen. For example, FIG. 15 illustrates a state when a timing signal is supplied, while the clock signal generator 52 stops supplying the system clock (SCLK) to the image capturing device 15 (in other words, a state that the image capturing device 15 is not capturing an image).

As described above, the idle period ta can be expressed by the following formula:

$$ta=ta'+ta''.$$

In the example illustrated in FIG. 15, ta is equal to ta' because ta" is zero.

In this case, where ts is a time during which the system clock is stopped from being supplied to the image capturing device 15 after the timing signal is supplied, the predicted time T required for the colorimetric patch 1 to reach the center position of the image capturing device 15 can be expressed by the following formula:

$$T=(Les+Lsp)/V=ts+ta'.$$

In other words, the system clock stop time ts can be expressed by the following formula:

$$ts=(Les+Lsp)/V-ta'.$$

When a timing signal is supplied, after stop supplying the system clock (SCLK) to the image capturing device 15, the clock signal generator 52 performs the above calculation process, and resumes supplying the system clock (SCLK) to the image capturing device 15, after the system clock stop time ts has elapsed.

In this manner, the clock signal generator 52 can make the colorimetric patch 1 reach the center in the image capturing range of the image capturing device 15, after the supply of the system clock (SCLK) has resumed. In other words, the image capturing device 15 can capture an image of the colorimetric patch 1 by positioning the colorimetric patch 1 at the center, as the image of the first frame.

Figure 16:
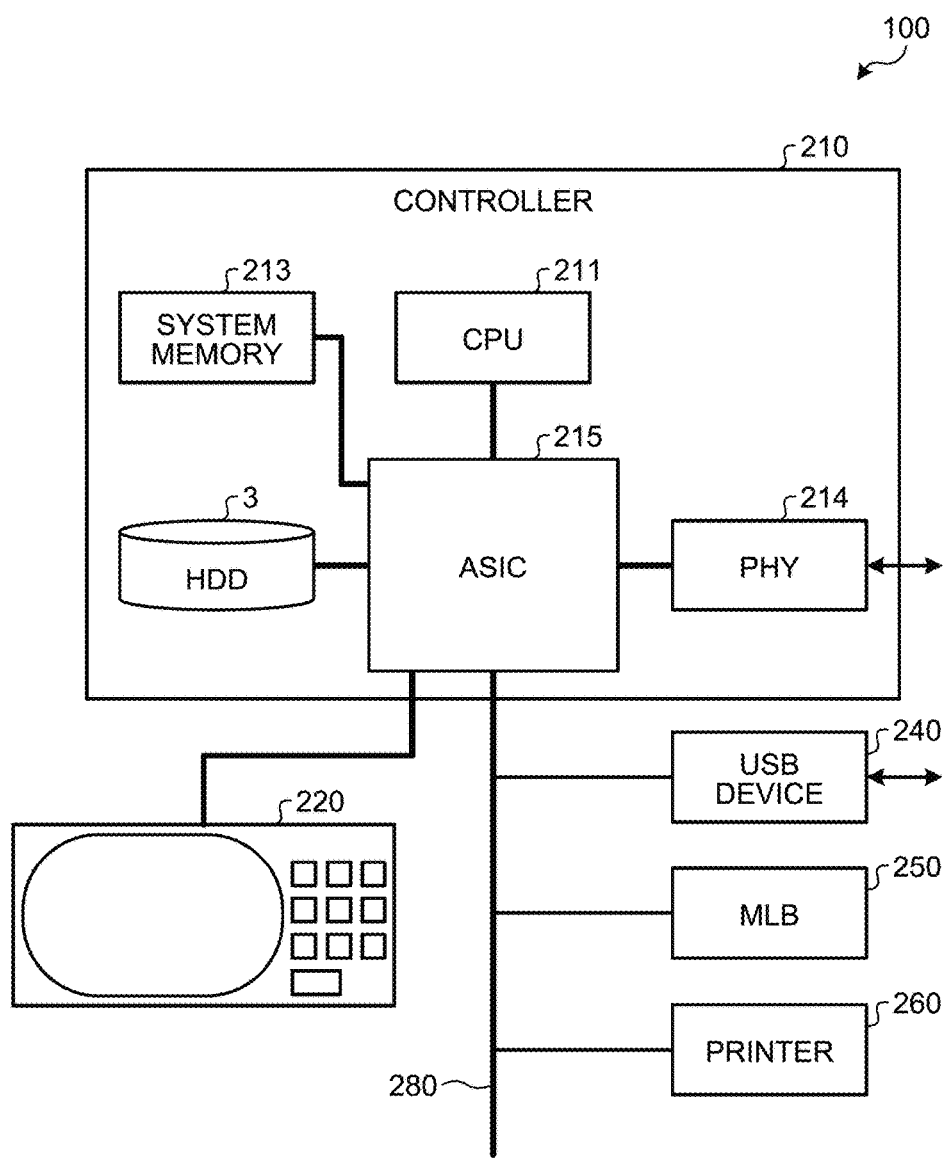
FIG. 16 is a block diagram illustrating an example of a hardware configuration of the image forming device.

FIG. 16 is a block diagram illustrating an example of a hardware configuration of the image forming device 100. As illustrated in FIG. 16, for example, the image forming device 100 described in the above embodiment includes a controller 210, an operation panel 220, a universal serial bus (USB) device 240, a media link board (MLB) 250, and a printer 260 that is an image forming unit.

The operation panel 220 is a user interface with which a user who uses the image forming device 100 enters various settings and on which various types of information for the user are displayed.

The controller 210 is a control device that controls the operation performed by the image forming device 100. As illustrated in FIG. 16, the controller 210 includes a CPU 211, a system memory 213, a hard disk drive (HDD) 3, a physical layer (PHY) (physical layer of a communication system circuit) 214, and an application specific integrated circuit (ASIC) 215. The operation panel 220 is connected to the ASIC 215 of the controller 210. The USB device 240, the MLB 250, and the printer 260 are connected to the ASIC 215 of the controller 210 via a data transmission bus 280.

In the image forming device 100 described in the present embodiment, the controller 210 mainly implements a part or all of the functional components as the controller 50 described above. In other words, for example, the ASIC 215 of the controller 210 implements a part of the controller 50, among the functional components described in the present embodiment. In addition, for example, the CPU 211 of the controller 210 implements a part of the controller 50, by executing a predetermined computer program (software) using the system memory 213.

The computer program described above is provided by being recorded on a computer-readable recording medium such as a compact disc read-only memory (CD-ROM), a flexible disk (FD), a compact disc recordable (CD-R), and a digital versatile disc (DVD) in an installable or executable file format in the image forming device 100. In addition, the computer program described above may be provided by being stored on a computer connected to a network such as the Internet, and causing a user to download it on the image forming device 100 via the network. Furthermore, the computer program described above may be provided or distributed via a network such as the Internet. Furthermore, for example, the computer program described above may be provided by being incorporated in advance in the system memory 213 and the HDD 3 in the image forming device 100.

The embodiment described above is an example of applying the present invention to the electrophotographic image forming device 100. However, for example, the present invention is also applicable to the image forming device of other types such as a line head inkjet printer and a serial head inkjet printer.

The present invention can advantageously capture an image of a target location in an object to be imaged with high accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image capturing system, comprising:
   an imager configured to move relative to an object to be imaged and capture an image of the object;
   a detector configured to detect a predetermined relative position of the object with respect to the imager; and
   a controller configured to switch from stop supplying a system clock to supplying the system clock based on the detected predetermined relative position, the system clock being used to control a timing to start capturing an image by the imager, wherein
   after stopping supply of the system clock, the controller resumes supplying the system clock to the imager according to a relative movement of the object, based on the detected predetermined relative position,
   wherein the controller is further configured to stop supplying the system clock to the imager, after entering an idle period that is not an image capturing period in the imager, upon receiving completion of an image capturing period in the imager.

2. The image capturing system according to claim 1, wherein the controller is further configured to predict a time required for the object to reach a center of an image capturing range of the imager.

3. The image capturing system according to claim 1, wherein
   the object is a color pattern formed on a recording medium,
   the image capturing system further comprises a colorimetric calculator configured to calculate a colorimetric value of the color pattern, based on an image captured by the imager.

4. The image capturing system according to claim 1, wherein the detector is further configured to detect a tip end of a recording medium on which the object is formed, as the predetermined relative position of the object.

5. The image capturing system according to claim 1, wherein the controller is further configured to immediately stop supplying the system clock to the imager, upon entering the idle period.

6. The image capturing system according to claim 1, wherein the controller is further configured to receive a detection signal of the predetermined relative position from the detector, while the system clock is stopped from being supplied to the imager.

7. An image forming device comprising:
   the image capturing system according to claim 1; and
   an image forming unit configured to form an image by performing color adjustment based on an image capturing result by the image capturing system.

8. An image capturing system, comprising:
   an imager configured to move relative to an object to be imaged and capture an image of the object;
   a detector configured to detect a predetermined relative position of the object with respect to the imager; and
   a controller configured to switch from stop supplying a system clock to supplying the system clock based on the detected predetermined relative position, the system clock being used to control a timing to start capturing an image by the imager, wherein
   after stopping supply of the system clock, the controller resumes supplying the system clock to the imager according to a relative movement of the object, based on the detected predetermined relative position, and
   wherein the controller is further configured to receive a detection signal of the predetermined relative position from the detector, while the system clock is supplied to the imager.

9. The image capturing system according to claim 8, wherein the controller is further configured to predict a time required for the object to reach a center of an image capturing range of the imager.

10. The image capturing system according to claim 8, wherein
    the object is a color pattern formed on a recording medium,
    the image capturing system further comprises a colorimetric calculator configured to calculate a colorimetric value of the color pattern, based on an image captured by the imager.

11. The image capturing system according to claim 8, wherein the detector is further configured to detect a tip end of a recording medium on which the object is formed, as the predetermined relative position of the object.

12. The image capturing system according to claim 8, wherein the controller is further configured to immediately stop supplying the system clock to the imager, upon receiving the completion of the image capturing period in the imager.

13. The image capturing system according to claim 8, wherein the controller is further configured to stop supplying the system clock to the imager, after entering an idle period that is not the image capturing period in the imager, upon receiving the completion of the image capturing period in the imager.

14. An image capturing method in an image capturing system including an imager configured to move relative to an object to be imaged and capture an image of the object, and a detector configured to detect a predetermined relative position of the object with respect to the imager, the image capturing method comprising:
    stopping supply of a system clock that controls a timing to start capturing an image by the imager, after entering an idle period that is not an image capturing period in the imager, upon receiving completion of an image capturing period in the imager; and
    resuming supply of the system clock to the imager according to a relative movement of the object, based on the predetermined relative position.

15. The image capturing method according to claim 14, wherein the stopping step is performed immediately upon entering the idle period.

* * * * *